United States Patent [19]

Fried et al.

[11] 4,298,028

[45] Nov. 3, 1981

[54] STARTING VALVE AND MOUNTING THEREFOR

[75] Inventors: Reinhard Fried, Nussbaumen; Andreas Mayer, Niederrohrdorf; Ambrogio Perego, Wettingen, all of Switzerland

[73] Assignee: BBC Brown, Boveri & Company Limited, Baden, Switzerland

[21] Appl. No.: 115,131

[22] Filed: Jan. 24, 1980

[30] Foreign Application Priority Data

Feb. 1, 1979 [CH] Switzerland .......................... 964/79

[51] Int. Cl.³ ........................ F16K 11/14; F16K 1/22
[52] U.S. Cl. .................................. 137/868; 137/607; 137/871; 251/305; 251/308; 308/166; 308/DIG. 7
[58] Field of Search .................. 123/179 G; 137/607, 137/868, 871; 251/305, 308; 308/164, 166, DIG. 7

[56] References Cited

U.S. PATENT DOCUMENTS 3,774,879 11/1973 Zink .............................. 251/308 X Primary Examiner—Gerald A. Michalsky
Attorney, Agent, or Firm—Burns, Doane, Swecker & Mathis

[57] ABSTRACT

A starting valve is disclosed having a starter choke valve and a poppet valve which is kept closed by the starter choke valve when the choke valve is in an open position. For mounting the starter choke valve there is provided a choke shaft and a bushing set screw which interact with a plurality of tapered bushes. The arrangement provides for an axial and a radial compression of the bushes to prevent foreign matter from fouling the movement of the choke. Also a compensation for the varying tolerances between the component parts is accomplished by providing a plurality of rubber-elastic components.

22 Claims, 4 Drawing Figures

STARTING VALVE AND MOUNTING THEREFOR

BACKGROUND AND SUMMARY OF THE PRESENT INVENTION

The present invention relates to a mounting for a starting valve.

A starting valve of a type where a choke valve pivots between two terminal positions is known. The choke shaft is usually mounted in radial bearings. Since the choke shaft is not free of play, particles of dirt can enter the bearings from the intake manifold and block the movement of the choke valve. Dirt can also enter when the choke valve employs a combination of radial and longitudinal bearings. Starting valves of this type therefore require careful servicing to ensure a proper and safe operation.

If it is desired to eliminate such play and the consequent infiltration of dirt particles in the known arrangements, it is necessary to construct the starting valves with very close tolerances. This requirement obviously increases the costs of the manufacture of such valves.

It is an object of the present invention to eliminate these and other disadvantages of prior starting valve arrangements.

It is a further object of the present invention to provide a starter choke valve of simple construction which for all practical purposes does not require any servicing, or periodic lubrication.

A still further object of the present invention is to provide a starting valve which will operate at higher temperatures, e.g., up to 200° C.

These and other objects are achieved by providing a mounting for a starter choke valve according to the present invention. The mounting comprises a choke shaft and bushing set screw which each interact with a plurality of tapered bushes. The arrangement provides an axial and a radial compression of the bushes to prevent foreign matter from blocking movement of the choke valve.

A further feature of the present invention resides in the provision of a plurality of elastic rubber components which equalize the tolerances between the various component parts.

BRIEF DESCRIPTION OF THE DRAWINGS

A preferred embodiment of a starting valve according to the present invention will be described with reference to the accompanying drawings wherein like members bear like reference numerals and wherein.

DETAILED DESCRIPTION OF THE PREFERRED EMBODIMENT

Figure 1:
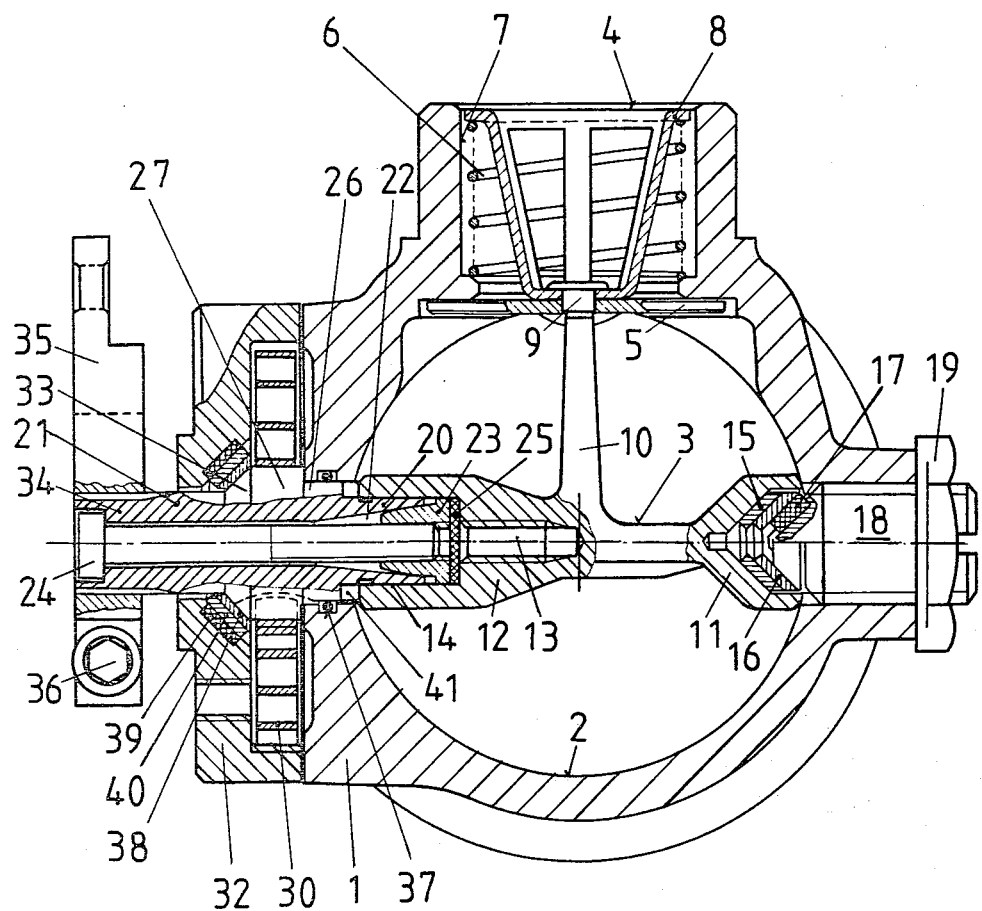
FIG. 1 is a vertical cross-sectional view of a starting valve according to the present invention.
Figure 2:
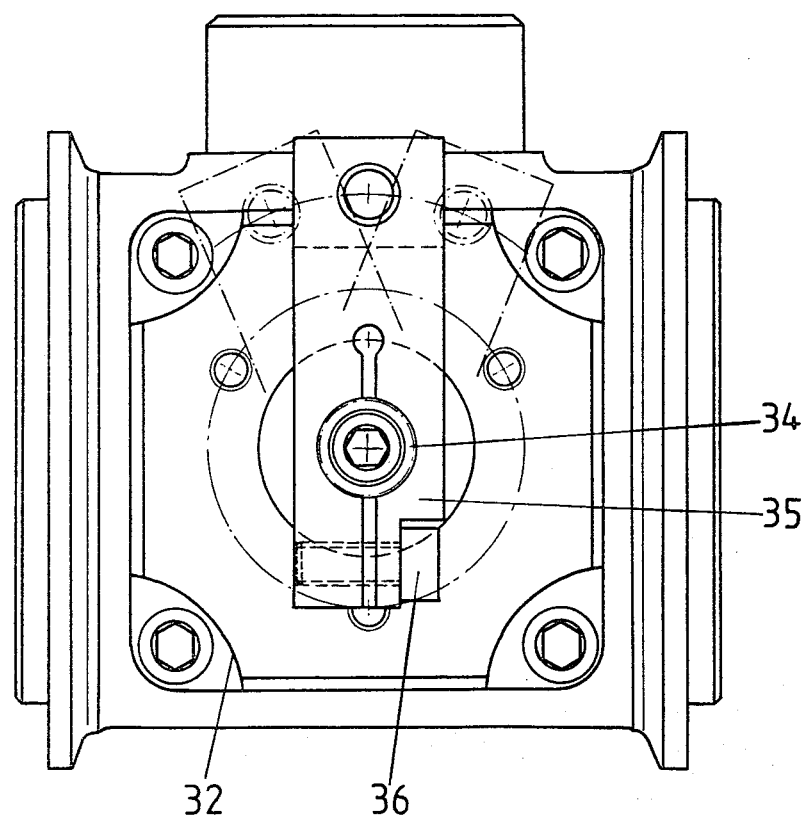
FIG. 2 is a side elevational view of the starting valve.

With reference to FIG. 1, a single-piece valve housing 1 has an intake duct 2 with a starter choke valve 3 pivotably mounted therein. The choke valve 3 pivots on an axis transverse to the direction of air flow through the duct 2.

At the top of the housing 1, there is arranged a poppet valve 4 which enables the engine to draw air directly from the outside during the starting phase of a supercharged engine with the starter choke valve closed. The air drawn through the poppet valve 4 bypasses a supercharger, for example, a pressure wave compressor (not shown). When sufficiently high pressure has built up in front of the closed starter choke valve to open the choke valve, the engine changes over to supercharged operation. During supercharged operation, the poppet valve 4 remains closed.

The poppet valve 4 comprises a valve head 5 and a spring 6 which rests at the bottom of a bore 7 in the housing 1. The poppet valve 4 also includes a spring basket 8 with an upper part of the spring basket 8 supporting the spring 6 and a lower part of the spring basket 8 being connected with the valve head 5 by a rivet 9. The valve head 5 is coated, at least throughout its seating area, preferably with Teflon to prevent sticking or freezing of the valve 4 as well as to resist corrosion and eliminate annoying metallic rattle. The spring basket 8 narrows towards the intake duct 2 and therefore the spring 6 moves freely even if the structure is tilted by the airflow. The narrowing of the spring basket 8 ensures a definite closing of the valve head 5 under any circumstances.

Figure 3:
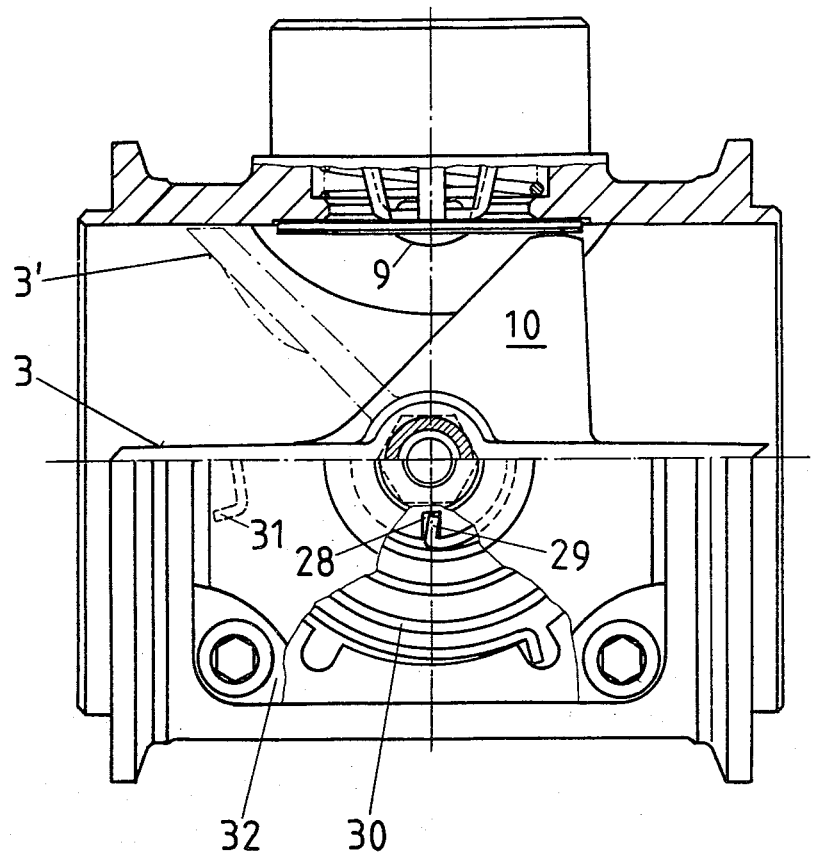
FIG. 3 is a view similar to FIG. 2 partially in section.

The starter choke valve 3 (as illustrated in FIGS. 1 and 3) has a horizontal open position. Only the upper half of the housing is illustrated in the form of a sectional view in FIG. 3 so that only one-half of the choke valve 3 is visible therein. The angle through which the choke valve 3 pivots between the open position and a closed position 3' (indicated in FIG. 3 by dots and dashes) is approximately 45°. The choke valve 3 carries a stop dog 10 on an upper surface which presses the valve head 5 onto its seat when the starter choke valve 3 is in the open position (see FIGS. 1 and 3). The stop dog 10 prevents opening of the poppet valve 4 and drawing of air through the same. The stop dog 10 additionally serves as a stop for the open position of the starter choke valve 3.

The starter choke valve 3 is provided at the two ends of the axis of rotation of the starter choke valve 3 with first and second enlarged sections 11, 12 respectively. The first enlarged section 11 contains a conical bearing while the second enlarged section 12 is provided with a tap hole 13 and an internal hexagonal bore 14. The tap hole 13 is provided to form a connection between the starter choke valve 3 and a choke shaft 21 other than a mating joint which is described below.

The conical bearing consists of a tapered bore which accomodates two tapered Teflon-coated multi-substance bushes 15, 16, made preferably of sheet metal and sintered bronze, or other suitable material. These bushes support a tapered rubber bushing 17 which is inserted in a slot in a bushing set screw 18. The set screw 18 is screwed into a threaded portion provided in the housing 1 so that a conical end engages the multi-substance bushes 15, 16. The set screw 18 is secured by a safety sheet metal bolt 19.

The internal hexagonal bore 14 accomodates a hexagonal portion 20 provided on the choke shaft 21. The choke shaft 21 is hollow and is provided at an end of the hexagonal portion 20 with an inside taper 22 within which an expanding cone 23 is arranged. The expanding cone 23 has an internal thread which tightens and holds the hexagonal portion of the choke shaft 21 to the internal hexagonal bore 14 when an internal hexagonal bolt 24 is tightened. At the bottom of the internal hexagonal bore 14 a rubber disk 25 is provided which controls the position of the expanding cone 23 within the internal hexagonal bore 14.

The hexagonal portion 20 on the choke shaft 21 is followed by a cylindrical pin 26 which merges into a cylindrical shoulder 27. The shoulder 27 contains a groove 28 (FIG. 3) which holds securely an inner end 29 of a helical plate spring 30. The helical plate spring 30 serves as a restoring spring for the choke valve 3. An outer end 31 of the spring 30 is secured in a bearing cap 32.

The portion of the choke valve shaft 21 which extends to the outside of the housing 1 is provided with a conical journal 33 and a cylindrical shaft section 34 having a multi-toothed profile, the latter two sections follow the cylindrical shoulder 27. A choke lever 35 is slotted within the region of the hub and is fastened to the shaft 21 by a binding screw 36. The choke lever 35 seats on the cylindrical shaft section 34. A circular seal 37, located in the housing 1, serves to seal the intake duct 2 from the spring chamber in the bearing cap 32. At the conical journal 33, two tapered, preferably Teflon-coated, multi-substance bushes 38 and 40 are arranged. Also, arranged in a slot in the bearing cap 32 is a tapered rubber bushing 39.

By mounting the starter choke valve 3 with the two tapered rubber bushings 17, 39 arranged on either side of the choke valve, the choke valve 3 may be adjusted so that it will be substantially free of play, axially as well as radially. The adjustment is accomplished by turning the bushing set screw 18 and by properly selecting the thickness of the rubber disk 25. Also, the resulting compression will, up to a certain point, automatically compensate for any changes due to wear and tear during the course of operation of the valve. The starter choke valve 3 moves easily within the Teflon-coated bushes. The bushes do not require any lubrication and operate effectively at temperatures up to 200° C. The elasticity of the two bushings 17, 39 will compensate for any variations in shape resulting from mass-production and further will have a vibration-absorbing effect.

In order to compensate for the varying tolerances due to inaccuracies in manufacture between the various interconnected component parts, i.e., the housing, the bearing cap, the rubber bushing, the multi-substance bushes, the choke shaft, and the choke valve, the hexagonal portion 20 is made longer than the internal hexagonal bore 14 so that a space 41 is provided for axial play between the cylindrical pin 26 and the frontal area of the second enlarged section 12. The size of the space 41 is controlled by the thickness of the rubber disk 25. The thickness of the disk 25 also influences the compression of the rubber bushing 39 in the bearing cap 32 and thus the bearing friction. This specific arrangement renders a close tolerance of the component parts and thus a more costly finishing technique unnecessary.

Figure 4:
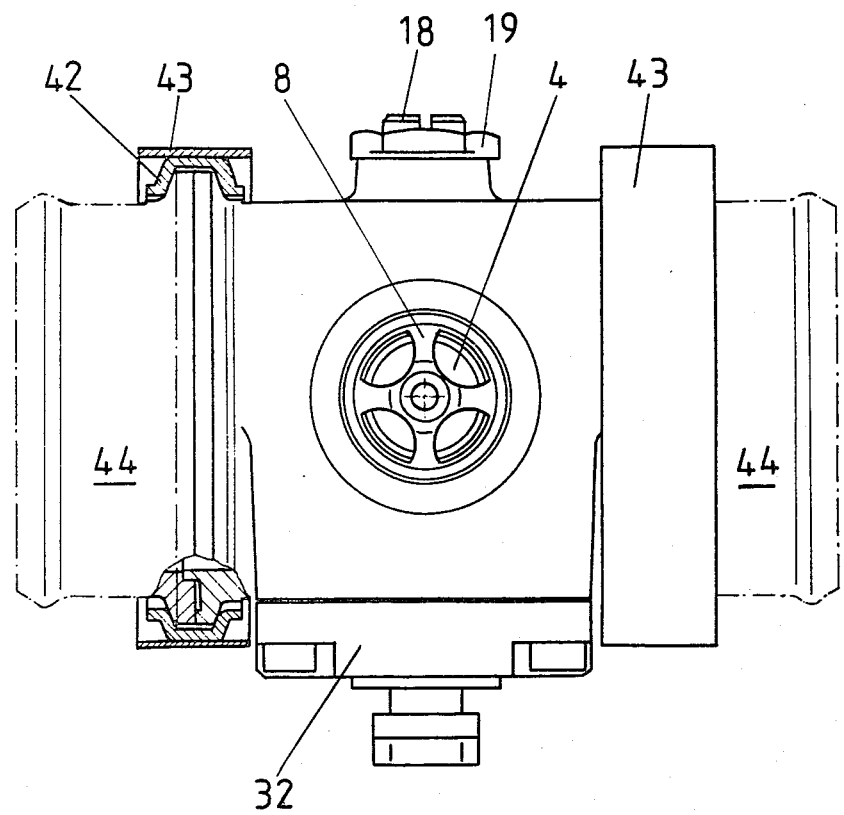
FIG. 4 is a top view of the starting valve according to the present invention.

The connection of intake pipe sections in front and in back of the starting valve can be accomplished for example by means of V-shaped straps 42 and tightening clamps 43 (FIG. 4). Pipe fittings 44 (shown in FIG. 4 by dot and dash lines) are provided for the connection of hoses.

In an alternate embodiment, the stop dog 10 which serves as a stop for the starter choke valve and as a locking device for the poppet valve may be constructed in the form of two projections. One projection would make contact with the inner wall of the duct 2 for limiting the pivotable motion of the starter choke valve 3 when in its open position, while the other projection would ensure the locking of the poppet valve 4 by resiliently engaging the center of the valve head 5 when the starter choke valve is in the open position. This projection would press the head onto its seat with a relatively weak force in order to prevent any deformation of the valve head.

The principles and preferred embodiment of the present invention have been described in the foregoing specification. However, the invention which is intended to be protected is not to be construed as limited to the particular embodiments disclosed. The embodiments are to be regarded as illustrative rather than restrictive. Variations and changes may be made by those skilled in the art without departing from the spirit of the present invention.

What is claimed is:

1. A mounting for a valve comprising:
    a valve pivotable within a housing about an axis from a closed position to an open position;
    first and second enlarged sections on the valve at first and second ends of the axis respectively;
    the first enlarged section containing first resilient bearing means for allowing the valve to pivot and means for adjustably securing the first resilient bearing means; and
    the second enlarged section containing means for non-rotatably mounting a valve shaft.

2. The mounting of claim 1 wherein the valve shaft is provided with conical surface means for engaging second resilient bearing means for permitting the valve to pivot.

3. The mounting of claim 2 wherein each of the first and the second resilient bearing means comprises two tapered bushes and one tapered rubber bushing.

4. The mounting of claim 3 wherein each of the individual bushes is comprised of a Teflon-coated multisubstance material.

5. The mounting of claim 1 or 3 wherein the means for adjustably securing the first resilient bearing means comprises a set screw having a conical end which engages the first resilient bearing means.

6. The mounting of claim 5 wherein the first resilient bearing means is arranged in a slot provided in the set screw.

7. The mounting of claim 1 or 2 wherein the means for non-rotatably mounting the valve shaft comprises a hexagonal portion on the valve shaft which is inserted in a hexagonal bore in the second enlarged section.

8. The mounting of claim 7 wherein the hexagonal portion on the valve shaft has an internal bore which internal bore receives a hexagonal bolt.

9. The mounting of claim 8 wherein the internal bore has an inside taper at an end, which taper receives expanding cone means for tightening and holding the hexagonal portion on the valve shaft within the hexagonal bore when the hexagonal bolt is tightened.

10. The mounting of claim 9 wherein a rubber disk is arranged between the expanding cone means and an end of the hexagonal bore.

11. A starting valve comprising:
    a starter choke valve pivotable within an inlet duct in a housing about an axis from a closed position to an open position;
    first and second enlarged sections on the choke valve at first and second ends of the axis respectively;
    the first enlarged section containing first resilient bearing means for allowing the choke valve to pivot and means for adjustably securing the first resilient bearing means; and the second enlarged section containing means for non-rotatably mounting a choke valve shaft.

12. The starting valve of claim 11 wherein the choke valve shaft is provided with conical surface means for engaging second resilient bearing means for permitting the valve to pivot.

13. The starting valve of claim 11 or 12 wherein the means for adjustably securing the first resilient bearing means comprises a set screw having a conical end which engages the first resilient bearing means.

14. The starting valve of claim 11 or 12 wherein the means for non-rotatably mounting the choke valve shaft comprises a hexagonal portion on the choke valve shaft which is inserted in a hexagonal bore in the second enlarged section.

15. The starting valve of claim 14 wherein the hexagonal portion on the valve shaft has an internal bore which internal bore receives a hexagonal bolt.

16. The starting valve of claim 15 wherein the internal bore has an inside taper at an end, which taper receives expanding cone means for tightening and holding the hexagonal portion on the choke valve shaft within the first hexagonal bore by tightening the hexagonal bolt.

17. The starting valve of claim 16 wherein a rubber disk is arranged between the expanding cone means and an end of the hexagonal bore.

18. The starting valve of claim 12 wherein one end of a restoring spring is attached to the choke valve shaft and the other end is fixed to a bearing cap, which bearing cap is attached to the housing.

19. The starting valve of claim 18 wherein the resilient bearing means is arranged in a slot provided in the bearing cup.

20. The starting valve of claim 11 wherein the housing contains poppet valve means for bypassing air around the choke valve when the choke valve is closed.

21. The starting valve of claim 20 wherein the choke valve is provided with stop means for closing the poppet valve means when the choke valve is in the open position.

22. The starting valve of claim 20 or 21 wherein the poppet valve means includes:
a valve head;
a valve seat;
spring means for biasing the valve head towards a closed position pressed against the valve seat; and
a spring basket arranged concentrically within the spring means, the spring basket being tapered inwardly towards the valve head.

* * * * *